United States Patent [19]
Lacoste-Bourgeacq et al.

[11] Patent Number: 6,132,779
[45] Date of Patent: *Oct. 17, 2000

[54] METHOD FOR REMOVING CELLULOSIC CASINGS FROM SAUSAGES

[75] Inventors: Jean-Francois Lacoste-Bourgeacq, Burr Ridge; Majed Fawaz, Downers Grove, both of Ill.

[73] Assignee: Viskase Corporation, Chicago, Ill.

[ * ] Notice: This patent is subject to a terminal disclaimer.

[21] Appl. No.: 09/442,993

[22] Filed: Nov. 19, 1999

Related U.S. Application Data

[63] Continuation-in-part of application No. 09/141,754, Aug. 28, 1998, Pat. No. 6,042,853.

[51] Int. Cl.⁷ .......................... A22C 13/00; A23L 1/317
[52] U.S. Cl. ........................ 426/57; 426/105; 426/135
[58] Field of Search ............................ 426/57, 105, 135; 428/34.8

[56] References Cited

U.S. PATENT DOCUMENTS

| | | | |
|---|---|---|---|
| 2,314,313 | 3/1943 | Rinehart . | |
| 2,365,728 | 12/1944 | Redemske . | |
| 5,236,726 | 8/1993 | Lancaster | 426/135 |
| 5,814,515 | 9/1998 | Viikari | 435/267 |
| 5,914,141 | 6/1999 | Stall | 426/105 |

FOREIGN PATENT DOCUMENTS

| | | |
|---|---|---|
| 195 23 874 A1 | 1/1997 | Germany . |
| 196 28 232 A1 | 1/1998 | Germany . |

*Primary Examiner*—Arthur L. Corbin
*Attorney, Agent, or Firm*—Roger Aceto

[57] ABSTRACT

The removal of a cellulosic casing from about a sausage, stuffed and processed in the casing, is accomplished by contacting the casing, either before or after stuffing, with a food grade enzyme, e.g.a. cellulase or cellulase enzyme complex, to metabolize the cellulosic casing on the sausage thereby producing a substantially casing-free sausage. Contacting the casing with the enzyme is accomplished prior to stuffing by applying an enzyme solution to the internal surface of the casing as part of an internal shirring spray or as a stripe to the exterior of the casing. Contacting with the enzyme after stuffing is accomplished by showering the stuffed casing with the enzyme solution. Also disclosed is the use of a combination of pre and post stuffing methods for applying the enzyme to the casing.

17 Claims, 2 Drawing Sheets

METHOD FOR REMOVING CELLULOSIC CASINGS FROM SAUSAGES

This application is a continuation-in-part of U.S. Ser. No. 141,754, filed Aug. 28, 1998; now U.S. Pat. No. 6,042,853.

FIELD OF THE INVENTION

The present invention relates to a method for removing casings from sausages and, in particular, for removing cellulosic casings from sausages such as frankfurters and the like.

BACKGROUND OF THE INVENTION

It is well known that certain types of sausages such as frankfurters, are made on automatic stuffing machines. These machines stuff an uncooked sausage emulsion into a long tubular casing while simultaneously forming the casing into links. Typically, the casing is of a regenerated cellulosic and the individual links are formed by twisting the casing during stuffing. The individual links also may be formed by pinching the stuffed casing. In any event, the result is a string of links that may be up to 50 meters or more long. The string is processed to cook or cure the emulsion and then the casing is removed to produce individual sausages ready for retail packaging. Casings for use in making linked sausages generally are made of a pure regenerated cellulose and are produced in sizes which range from about 14.5 to 45 mm in diameter.

Peeling the cellulose casing from the sausages has presented particular problems to the art. In this respect, peeling aid solutions have been developed. These peeling aid solutions are applied to the inner wall of the casing by the casing manufacturer. Generally the solutions include compounds that create an aqueous film between the surface of the sausage and the casing. This film reduces the adhesion of the casing to the surface of the sausage and thus facilitates the peeling of the casing from the sausage. The effect of such peeling aids varies depending upon the particular formulation of the emulsion being stuffed and the processing conditions. Accordingly, it is not unusual for casing manufacturers to offer several different peeling treatments to accommodate the particular needs of its customers. The application of a peeling solution to the interior of the cellulose casing also requires additional materials and manufacturing steps that add to the casing cost.

U.S. Pat. No. 5,914,141 discloses application of proteases and lipases to the interior of the casing as a peeling aid. These enzymes degrade the stuffed sausage contents adjacent the inner surface of the casing so as to facilitate the subsequent peeling of the casing from the sausage. However, this may lead to a sausage that has a poor "bite" since the toughened cooked surface of the sasusage is degraded by the enzyme.

A typical method used by the sausage maker to remove the cellulose casing from the sausages is to run the string of links through a mechanical peeler. The peeler has a knife edge that longitudinally slits the casing. The string then passes over a perforated wheel connected to a vacuum source. The vacuum pulls the casing around the wheel and away from the sausages while the sausages are allowed to pass tangentially off the wheel. This separates the casing and frees the individual sausage links. The peeling apparatus also commonly exposes the string of sausages to steam to help loosen the casing from the sausage and facilitate peeling. Mechanical peelers of this type are shown in U.S. Pat. Nos. 3,698,973; 4,118,828; and 4,414,707 among others.

Mechanical peelers while comprising the present preferred method for peeling sausages, have several drawbacks. For example, the knife edge becomes dull and must be replaced periodically. If the knife edge is improperly positioned, it either will not cut through the casing or it may cut too deeply and score the sausage. If the casing is not cut, it can not be separated from the sausage. Thus, the knife edge must be critically controlled for bearing pressure and placement with respect to the casing surface in order to properly slit the casing without deeply scoring the surface of the sausage. The use of steam also is an objectionable part of the process even though it often is necessary for high percentage peeling. Use of steam results in high utility costs. The steam condenses and the free-standing water which results makes for an unsafe work environment. Also, the condensed steam collects on the peeled sausages and is a source of contamination. The problems caused by condensation is particularly acute if the steam peeling is conducted in a refrigerated environment.

Mechanical peelers and the use of casing treatments are not 100% effective. Often shards or bigger sections of casing remain on the peeled link that must be removed manually. Casing manufactures often add color or stripes to the cellulose casing to facilitate spotting the casing piece on the peeled sausage. These stripes or colors further add to the casing cost.

Disposal of the spent casing after removal from the sausages is another problem for the sausage manufacturer. Typically the spent casing is sent to a land fill. This is costly in terms of hauling and landfill charges.

In view of the drawbacks of methods currently in use for peeling cellulose casings from sausages, the need exists for an improved method for removing the casing from frankfurters that does not depend upon chemical easy peeling treatments applied to the inner surface of the casing to facilitate the peeling of the casing from the sausage. An improved method also is one that eliminates the need to contact the processed sausage with steam to facilitate the separation of the cellulose casing from the sausage. The need further exists for a method that eliminates the need for mechanical peelers to remove a cellulose casing from the sausages.

Accordingly, one object of the present invention is to provide an improved method for removing cellulose casings from sausages.

Another object of the present invention is to provide a method for removing cellulose casing from sausages that avoids the need for applying a product-specific easy peeling chemical treatment to the inner surface of the casing.

A further object of the present invention is to eliminate the use of mechanical peelers and steam assisted peeling to remove cellulose casings from frankfurter sausages and the like.

Yet another object is to provide a method of removing cellulose casing from sausages that eliminates the need for land filling the spent casing.

SUMMARY OF THE INVENTION

The present invention is a method of removing a cellulosic food casing from about a stuffed sausage by action of food grade enzymes or enzymes which are generally recognized as safe (GRAS), and which have the ability to hydrolyze cellulose and hemicellulose. This can be accomplished by contacting the string of processed sausages with a solution containing the enzyme or enzyme blend. Contacting the encased sausages with the enzyme can be accomplished in several ways. For example, the sausages, after stuffing, can be dipped in the enzyme solution or showered with the solution.

When applied in this fashion, the enzyme can degrade the cellulosic casing about the entire circumference of the sausage so the casing can be removed by washing or agitation. If the residence time of the enzyme in contact with the casing is long enough, the entire casing will be consumed by the enzyme.

It also is possible to apply the enzyme solution as an internal spray during the shirring of the casing to apply a uniform coating of the enzyme about the internal surface of the casing or about the external surface or both. The enzyme is inactive until the casing is stuffed and processed at which time it begins the metabolism of the cellulose. For example, in the case of making frankfurters, stuffing the casing with the raw meat emulsion and the subsequent processing at an elevated temperature to cook the emulsion will activate the enzyme. The encased sausages are then held until the casing is metabolized.

In yet another form of application, the enzyme can be applied as a longitudinal aqueous stripe to the casing outer surface and dried. After the enzyme is activated by the stuffing and subsequent processing of the stuffed casing, the enzyme will open a longitudinal seam in the casing to permit removal of the sausages.

A combination of the above methods also can be used to accelerate the peeling or removal of the casing. For example the casing first can be provided with the enzyme in the form of a longitudinal stripe and then further contacted with the enzyme after stuffing such as by dipping or showering. This exposes the cellulose to a higher concentration of the enzyme thereby speeding the opening of the casing.

It should be appreciated that if too high a concentration of the enzyme is applied to the casing prior to stuffing, there is a danger that the casing will be weakened prior to stuffing. To avoid this and to apply a higher concentration, the enzyme can be micro encapsulated to provide a protective coating around the enzyme. The micro capsules then are applied to the casing, for example, as a stripe. The enzyme in the micro capsules remains inactive until the protective coating is removed by exposure to the stuffing and processing conditions. For example stuffing adds moisture that will dissolve a water soluble coating whereas the heat of processing will melt a heat sensitive coating to release the enzyme.

Enzymes particularly suited to metabolize a cellulose casing include cellulase and xylanase. It has been found that a few hours in contact with a solution containing the appropriate enzyme or enzyme blend is sufficient to permit the enzyme to metabolize the cellulose casing so as to rid the sausage of its casing. Given a high enough concentration and proper conditions, the enzyme opens the casing in times less than one hour.

It is not necessary for purposes of the present invention to have the cellulose casing completely metabolized by the enzyme in order to remove the casing from the sausage. It is sufficient that the enzyme degrades the casing to the point where either the sausage and casing can be separated or casing pieces remaining on the sausage can be removed by rinsing.

The sausages, once they are rid of the casing, are considered to be "skinless". They are then collected and packaged for the retail trade. If desired, the skinless sausages are rinsed prior to packaging. The sausages still encased can be packaged as it has been found that the enzymatic action will proceed in the package so that by the time the packages are opened for use, the casing is completely metabolized to provide a "skinless" sausage.

If the stuffed casings are showered or dipped until the casings are substantially metabolized, the solution which remains after the skinless sausages are collected contains the by-products of metabolizing the cellulose including glucose, xylose, cellobiose, and other oligosaccharides. The solution may also contain bits of cellulose if the metabolism has not gone to completion. This solution either is discharged to the sewer, processed to recover the glucose and other by-products, or is processed for use as an animal feed. Preferably, processing of the solution includes recovery of the enzyme for reuse.

Accordingly, the method of using an enzyme to metabolize the cellulose food casing on the sausage addresses and resolves the problems associated with applying product-specific easy peel treatments to the casing interior, use of steam to assist in mechanically peeling the casing and dealing with the spent casing after peeling.

Several enzymes that have been found suitable are MULTIFECT® CL, MULTIFECT® GC, and MULTIFECT® XL all sold by Genencor Corporation of Rochester, N.Y. These enzyme formulations are GRAS and are derived from selected strains of Trichoderma longibrachiatum (formerly Trichoderma reesei).

At present, the only commercial process for manufacture of a cellulose casing involves use of the well-known viscose process. In the viscose process a natural cellulose is contacted with a strong base to produce alkali cellulose. The alkali cellulose then is reacted with other chemicals to produce cellulose xanthate, a soluble cellulose derivative. The xanthate is extruded as a tube into an acid bath. The acid reacts with the xanthate to regenerate the cellulose. Thus, with the viscose process, there is a first chemical reaction to create a soluble cellulose derivative and a second chemical reaction to regenerate the cellulose from the derivative.

More recently, a solution process has been adapted to the production of cellulose casing. In a solution process a cellulose casing is formed by a method involving the direct dissolution of a natural cellulose, such as wood pulp, by a cellulose solvent, such as N-methyl-morpholine-N-oxide (NMMO). The solution is extruded as a tube into a bath of a non cellulose solvent, such as water, to extract the solvent and precipitate or regenerate the cellulose. Thus when using a solution process, a non derivitized cellulose casing is formed in contrast with a derivitized cellulose casing formed using a process such as the viscose process. Reference is made to U.S. Pat. Nos. 5,277,857 and 5,451,364 for more details of a method for forming a casing of a non derivitized cellulose. For purposes of the present invention a "non derivitized" cellulose means a cellulose which has not been subjected to covalent bonding with a solvent or reagent but which has been dissolved by association with a solvent or reagent through Van der Waals forces and/or hydrogen bonding.

Unexpectedly, it has been found that the enzyme is more effective against a non derivitized cellulose casing than against a derivitized cellulose casing. It is not understood why the enzyme metabolizes a casing of non derivitized cellulose faster than a casing of a derivitized cellulose. One possible reason is that the derivitized cellulose may contain trace amounts of a sulfur compound that may inhibit enzyme activity. These sulfur compounds commonly evolve during the chemical reaction for regenerating the derivitized cellulose. U.S. Pat. No. 5,702,783, discloses that the crystalline structure of non derivitized cellulose casing is different from the crystalline structure of a casing of derivitized cellulose. This difference in crystalline structure may be the reason why the non derivitized cellulose is more susceptible to enzymatic metabolism.

For what ever the reason, it has been found that non derivitized cellulose is more susceptible to enzyme action than is a derivitized cellulose.

For example, a non derivitized cellulose casing is opened by enzyme action in as short a time as 0.5 hours and is made completely soluble by the enzyme in as short a time as five hours. In contrast, a derivitized cellulose casing takes longer to be opened by enzyme action and is made completely soluble in 5.5 to 7.0 hours. Thus, a preferred embodiment of the invention involves the use of a non derivitized cellulose casing to make the sausages.

Accordingly, the present invention may be characterized in one aspect thereof by a method for removing a cellulose casing from sausages such as frankfurters and the like comprising contacting the encased sausage with a solution containing a food approved enzyme under conditions permitting the enzyme to metabolize an amount of casing to such an extent that the casing separates from the sausage thereby producing a substantially casing-free sausage.

DETAILED DESCRIPTION OF THE INVENTION

Figure 1:
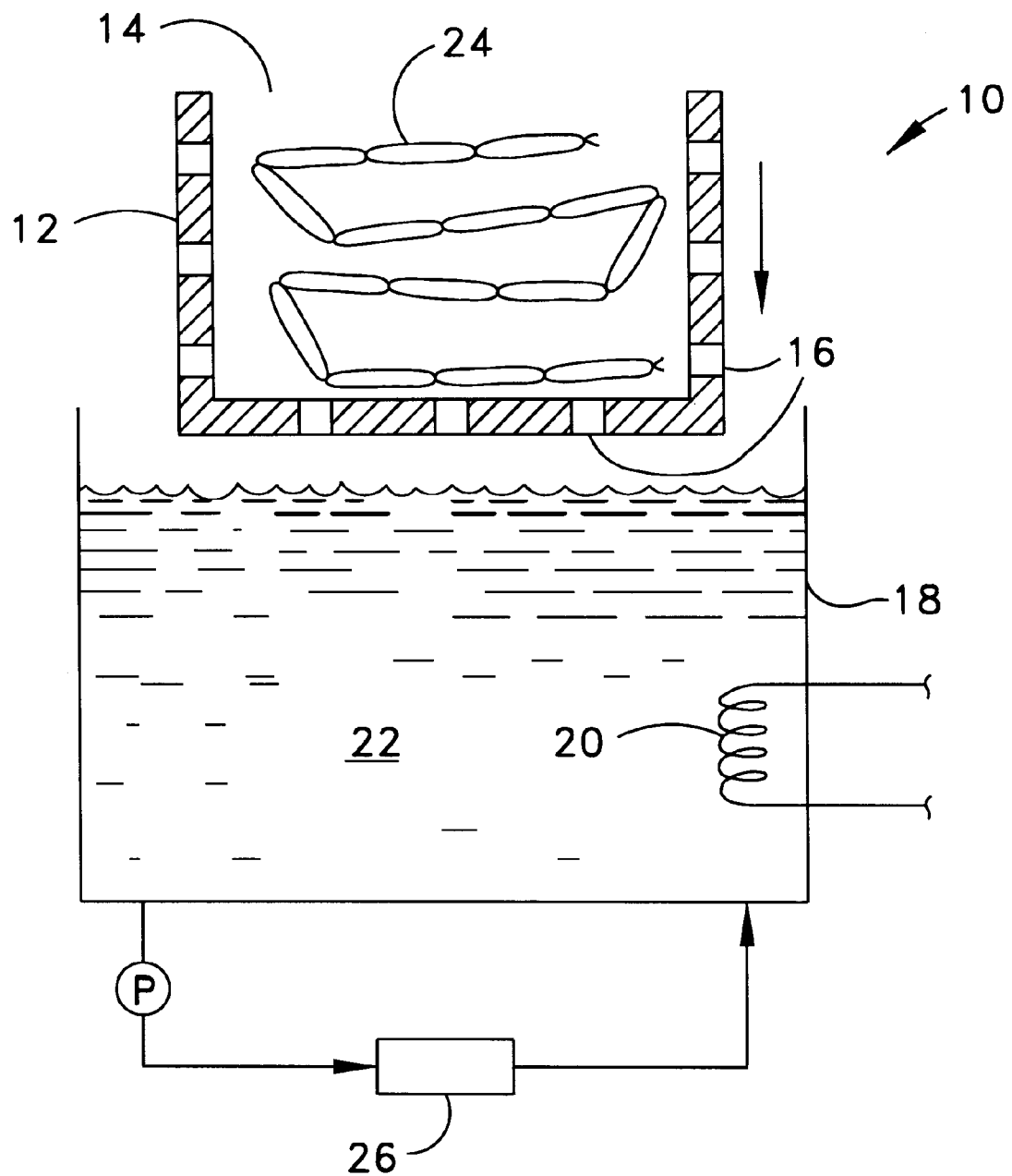
FIG. 1 is a schematic representation showing apparatus for carrying out the method of the present invention.

Referring to the drawing, FIG. 1 shows one embodiment of the apparatus for carring out the method of the present invention generally indicated at 10. The apparatus includes container 12 that is open at its upper end 14. The bottom and side walls of the container each have a plurality of openings 16. Container 12 is arranged for movement into and out of a vat 18. The vat preferably is provided with a temperature control means 20 and contains a solution 22 that includes a food approved enzyme or enzyme blend capable of metabolizing cellulose and/or hemicellulose.

In operation, a string of frankfurters 24 is placed into the container 12. The frankfurter string consists of cooked frankfurters encased in a cellulose food casing. Preferably, the frankfurters are fresh from the processing operation that has cooked the emulsion stuffed into the cellulose casing. As an alternative, the string may be divided by cutting the connective casing between the frankfurters so the cellulose encased frankfurters of the string are separated one from another.

The container 12 is lowered into the vat. The openings 16 allow the enzyme-containing solution 22 in the vat to enter and fill the container. The container is kept in the vat for a time sufficient to permit the enzyme to metabolize the cellulose casing on the frankfurter. If desired, means (not shown) may be provided to force the circulation of the enzyme-containing solution through the container. The frankfurters can remain in contact with the enzyme until the cellulose is fully metabolized. However, as metabolism progresses, the casing is degraded to such an extent that pieces and flecks of casing are easily washed or otherwise removed from the frankfurter. Accordingly, the complete removal of the casing from the frankfurter does not depend on fully metabolizing the casing.

After the cellulose has been metabolized, the container is lifted from the vat. The enzyme-containing solution drains from the openings 16 and back into the vat as the container is lifted. In this fashion the frankfurters, now casing-free, are recovered from the solution. They are then removed from the container, rinsed if necessary to remove any residual casing bits and then passed on for retail packaging.

The solution that remains in the vat is glucose rich as a result of the metabolism of the cellulose by the enzyme and likely contains flecks of casing as well as other metabolism by-products such as monosaccharides (xylose) and oligosaccharides. This solution can be further processed to concentrate or recover the glucose and other by-products for other uses, such as for example, use as an animal feed. Enzymes also can be recovered from the solution for reuse.

It is known that by-products of the cellulose digestion such as glucose, may inhibit the action of the enzyme. Accordingly, to maintain enzyme activity, the enzyme-containing solution 22 as it becomes contaminated by the by-products of the cellulose metabolism, may be circulated through an ultra filtration unit indicated at 26. In the ultra filtration unit, the glucose and other by-products such as oligosaccharides are removed. This allows an enzyme rich solution to be circulated back to the vat 18.

It has been found that the area of the cellulose casing that undergoes the fastest metabolism by the cellulase is along a seam in the casing believed to be the extrusion fold. The extrusion fold is a longitudinal fold produced during the manufacture of the casing. The fold occurs as the casing, in a gel state, is laid flat and passed between nip rollers prior to drying. The cellulose casing is probably weakest along the extrusion fold which may account for the faster metabolism in this area.

The metabolism of the casing by the enzyme first opens a seam along one or both of the extrusion folds. At this point the casing is not completely removed from the casing. However, while it is preferred to allow the enzyme to completely metabolize the casing, the opening of a seam does provide an opportunity to shorten the cycle time of the process. In this respect rather than wait until all of the cellulose casing has been metabolized, the frankfurters can be removed from the container 12 when the seam is opened in the casing. Either the opened casing will drop from the sausages or a pressure wash can be used to remove the casing from about the sausages.

Figure 2:
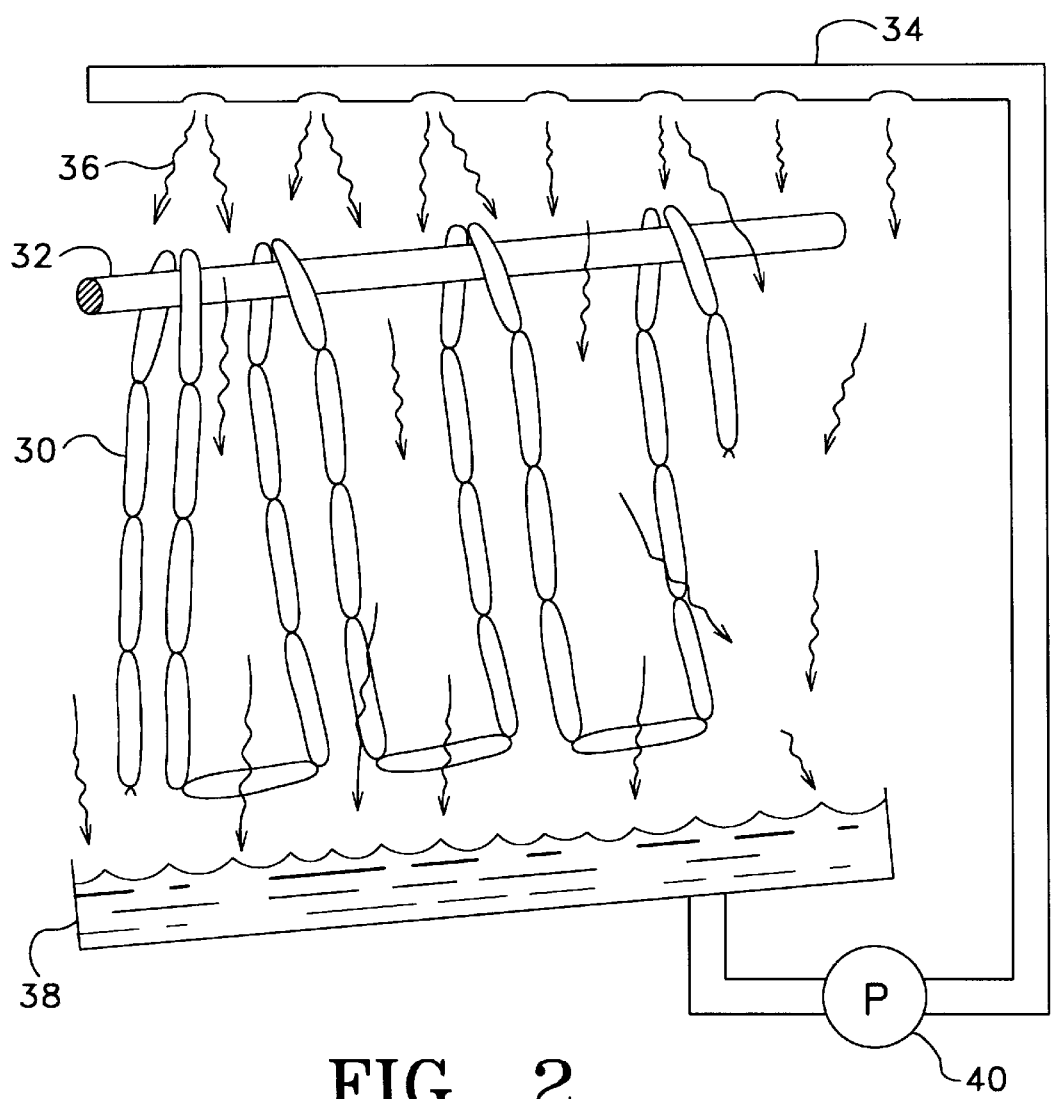
FIG. 2 illustrates a second embodiment of the invention.

FIG. 2 shows another embodiment of the invention wherein the string of sausage links 30 is looped over a transport bar 32 as is conventional in the art. The transport bar is supported for movement through a processing chamber (not shown) and the sausages are cooked during the residence time in the chamber. In accordance with the present invention a shower head 34 is provided at some point in the path of travel of the transport bar. Enzyme solution 36 is sprayed from the shower head and over the string of links 30. The solution is collected in a trough 38 and is recirculated to the shower head by a pump 40. The purpose of the enzyme shower is to deteriorate the casing so that individual sausage links can be easily separated from the casing after leaving the processing chamber. The time of transit through the processing chamber and the concentration of the enzyme will cooperate to degrade the casing to the point where individual sausages drop from the strand. A rack or belt (not shown) may be located beneath the transport bar to collect these dropped links.

Figure 3:
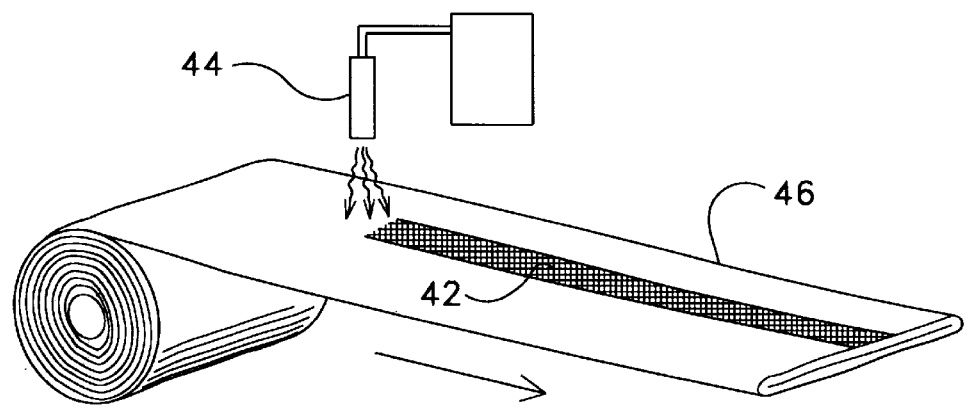
FIG. 3 illustrates a third embodiment of the invention.

FIG. 3 illustrates still another embodiment of the invention. In the FIG. 3 embodiment, the enzyme solution is applied as a stripe 42 to the casing 46. This is done preferably prior to shirring by running flattened casing beneath any suitable applicator 44 such as a spray nozzle, brush or the like. The applicator deposits the enzyme solution on the casing after which heat is applied to dry the solution. The casing is then wound onto a reel (not shown) and subsequently shirred for use by the sausage maker.

Several tests were conducted to demonstrate the method of the present invention.

EXAMPLE 1

A first test was conducted for screening purposes to determine the optimal conditions for the enzyme. In the test, spent casing of a conventional derivitized cellulose was exposed to various concentrations of an enzyme active against cellulose. The spent derivitized cellulose casing consisted of NOJAX® cellulose casing made by Viskase Corporation recovered from a conventional mechanical peeling machine. In the screening tests, the enzyme used was a MULTIFECT® CL enzyme sold by Genencor International, Inc. According to the manufacturer, this enzyme is generally recognized as safe (GRAS). It is a fungal cellulase derived from a selected strain of *Trichoderma reesei* and its activity is standardized on the basis of its ability to metabolize carboxymethylcellulose (CMC) to glucose. The minimum CMC activity of this enzyme is represented as being 2,000 IU/ml wherein one IU (International Unit) of activity liberates 1 μmole of reducing sugar (glucose equivalent) in one minute at 50° C. and pH of 4.8. The enzyme is said to degrade crystalline or amorphous cellulose.

In the screening test, three enzyme solution samples were prepared by adding 0.25 gm/liter, 0.5 gm/liter and 2 gm/liter respectively of the enzyme to 100 grams of a pH 5 buffer solution at a temperature of about 50° C. Six samples were prepared at each concentration giving a total of 18 samples. The spent casing was not washed to remove any fats or oils remaining on the inner surface of the casing after peeling. However, the spent casing was dried in order to more accurately measure the amount of cellulose being used in the test.

Ten grams of the dried spent cellulose casing were added to each sample. After different time intervals samples were centrifuged for thirty minutes at 3000 RPM to recover solids. The solids were weighed and ten grams of the remaining liquid fraction from each sample were analyzed for glucose content. Glucose is not the sole by-product of the metabolism of the cellulose by the enzyme. As noted above, other compounds such as xylose and oligosaccharides are produced. However, the amount of glucose is a convenient indicator of the efficiency of the enzyme to metabolize the cellulose.

After about three hours in the highest concentration solution of 2.0 gm/liter, the solids content of the original 10 gm sample was reduced by 2 gm and the glucose content of the liquid fraction increased to 1704 ppm, which translates to 1.7% of the dry casing as being converted to glucose. After 28 hours the solids content was reduced to about 6 gm with the glucose content increasing to about 8305 ppm. This means that about 8.31% of the dry casing was converted to glucose. While reducing the solids content by almost one-half over a period of 28 hours is significant, it is not an indication that enzyme action could function as a peeling mechanism.

Similar tests conducted at a pH of 5.6 produced results not as good as those conducted at a pH 5. Other tests conducted at pH 5 and at temperatures of 40° and 60° C. were not as good as those conducted at 50° C.

The screening indicated that the enzyme appeared to be most effective against the cellulose casing at a temperature of 50° C. and a pH of 5. Accordingly, further tests were conducted under these conditions.

EXAMPLE II

The enzyme concentration was raised to 20 gm/liter to increase the speed of the cellulose degradation by the enzyme. Five liter samples of a buffered (pH 5) solution were prepared, each containing a 20.0 gm/liter concentration of the MULTIFECT® CL enzyme. One kilogram of frankfurters, comprising a string of about fifteen links was place in each of the five liters of solution. The solutions then were heated to a temperature of about 50° C. Frankfurters stuffed in casings of both derivitized and non derivitized cellulose casings were tested separately. The samples were observed over a period of about four hours and during this time, some metabolism of both casings was observed. The samples were left over night for a total time in the enzyme solution of about eighteen hours. By morning, the casing in both cases was completely metabolized and the individual sausages were casing-free. Glucose analysis showed that after eighteen hours, about 86% of the non-derivitized cellulose had been converted to glucose and 83.2% of the derivitized cellulose had been converted.

There are various reasons why the enzyme was slow to metabolize the spent casing in the screening test but successfully metabolized all of the casing (both the derivitized type and the non derivitized casing) in less than eighteen hours. One reason is the higher enzyme concentration. Another possible contributing factor is that the contact of the enzyme with the fats and oils from the spent casing interfered with the action of the enzyme. In the second test which used stuffed casing, the enzyme only could contact the outer surface of the casing which is relatively free of fats and oils.

EXAMPLE III

Given the results of the second test, a third test was conducted in order to determine more precisely, the time taken to metabolize the samples. In the third test, the test conditions of the second test were repeated except that the samples were inspected at intervals of 10, 25, 50, 80, 140 and 170 minutes.

After ten and twenty-five minute intervals there appeared to be no visual change in either type of casing. After about fifty minutes, both types of casing appeared to tear more easily indicating a weakening of the cellulose structure by the enzyme. This weakening was most apparent along the extrusion fold.

After about 170 minutes, the non-derivitized casing was metabolized along the extrusion fold to such an extent that a seam had opened allowing easy removal of sausages from the casing. Metabolism of the extrusion fold of the derivitized cellulose casing was noticed but the casing was still intact and no seam had opened.

The test was allowed to continue. By five hours, a seam had opened in the derivitized cellulose casing allowing removal of some sausages from the casing. After about seven hours, almost all of the non derivitized cellulose casing had been metabolized leaving the individual sausages clean and free of casing, whereas the derivitized cellulose still was mostly intact about the sausages.

Based on these tests it is apparent that an enzyme having the ability to hydrolyze cellulose is effective for removing cellulose casing from a stuffed sausage such as a string of frankfurters. This is particularly the case when using a casing made with a non derivitized cellulose because the enzyme appears to attack and is able to metabolize a non derivitized cellulose casing much faster than a derivitized cellulose casing. Thus the use of an enzyme to remove casing from a string of stuffed sausages is a viable alternative to mechanical peeling.

EXAMPLE IV

An additional screening test using the conditions noted above, was conducted using MULTIFECT® XL enzyme. MULTIFECT® XL is identified by the manufacturer to be a cellulase enzyme complex with endoxylanase activity. The enzyme is derived from a strain of Trichoderma reesei and is said to have minimum activity of 445 XAU where the XAU (Xylanase Activity Unit) is based on the release of Remazol Brilliant Blue-dyed oat spelt xylan at pH 4.5 at 40° C. in ten minutes using an endoxylanase reference standard. The enzyme is said to have virtually no protease, lipase or amylase side-activities.

The same spent NOJAX® casing was used in the tests with a solids and glucose analysis being made at intervals of 1, 2, 20, and 24 hours. At a pH of 5 and temperature of 50° C., the enzyme reduced the initial ten gram sample of casing to 6.6 grams in twenty hours and to 6.4 grams in twenty-four hours. However, glucose analysis showed that after 24 hours, 17.13% of the cellulase had been converted to glucose as opposed to an 8.31% conversion for the MULTIFECT® CL enzyme in twenty-eight hours (see above).

Since cellulose casing is not known to contain a large percentage of xylan, the amount of glucose produced confirms that the XL enzyme does include a cellulase. From this screening, and based on the amount of cellulose converted to glucose, it is apparent that both types of enzymes (cellulase and xylanase), working together, are more effective in metabolizing the cellulose casing than a cellulase alone.

EXAMPLE V

In another test, frankfurters in casings of both derivitized and non derivitized cellulose casings were exposed to different enzymes. In all cases the enzyme concentration was 20 gm/liter at pH 5 and 50° C. Two solutions were prepared, one containing the MULTIFECT® XL and another containing a 50/50 blend of the MULTIFECT® XL with MULTIFECT® CL. Strings of ten frankfurters each (about 0.5 kilograms) were placed in beakers containing 2.5 liters of each buffered enzyme solution heated to 50° C. Periodically, visual observations were made to determine the extent of the cellulose degradation.

From a purely visual observation, there was little difference between the action of the XL alone and the XL/CL blend on the non derivitized cellulose casing. After 0.5 hours in the XL solution the casing was broken along a longitudinal seam. After 1.5 hours about 85% of the casing was gone and nine of the ten frankfurters were free of the casing. In this respect, enough of the casing was metabolized to permit the remaining casing to slip from the frankfurter and settle in the beaker. At 2.0 hours about 95% of the casing was solubilized. At 3.5 hours substantially all the casing was gone and at 5.0 hours no casing was seen. In the blend solution about 95% of the casing was solubilized after 2.0 hours.

The same general trend, albeit somewhat slower, was observed with the frankfurters stuffed into a derivitized cellulose casing and the XL/CL blend appeared to be slightly more effective based on visual observations, than the XL alone. Here, after 1.5 hours about 60% of the derivitized casing was solubilized by the XUCL blend and some of the frankfurters had slipped from the casing. After 3.5 hours in the XL/CL blend solution and after 4.5 hours in the XL solution about 95% of the cellulose had been solubilized. No visible piece of the derivitized cellulose casing remained in either solution after 5.5 to 6 hours.

As compared with the previous tests using MULTIFECT® CL alone, the XL enzyme containing a greater proportion of xylanase and the CUXL blend both appeared to be the more effective agent to metabolize either types of cellulose casing.

EXAMPLE VI

In another test the MULTIFECT® XL enzyme was applied to the interior surface of the casing during shirring as part of a mineral oil free shirring solution at the rate of about 577.8 ml/645 $cm^2$. The shirred casing was stored for a period of 42 days at a temperature of about 40° F. (4° C.). The casing was then stuffed with a standard frankfurter emulsion and processed to produce a string of frankfurter links. After processing, the string was separated into individual links still encased in the cellulose casing. The separated encased links were placed into conventional packaging which was evacuated to vacuum package the links. The packages were stored in a refrigerator at a temperature of about 40 F. (4° C.) for a period of 15 days. When the packages were opened it was found that the frankfurters were "skinless". During the storage period, the enzymes had completely metabolized the cellulose casing on the frankfurters.

EXAMPLE VII

In another test, MULTIFECT® XL enzyme was applied as a stripe to a casing of non derivatized cellulose as shown in FIG. 3. This was done to test the feasibility of having the stripe of enzyme act as a zipper to open the casing after stuffing and processing. The enzyme solution was applied in three concentrations by spraying as a stripe onto the external surface of the flattened casing. In one application the enzyme was applied as received from the manufacturer (100% solution). In a second application the enzyme was diluted to a 50% solution with a pH 5 buffer and in a third application it was diluted to a 25% with the same buffer solution. Each solution was applied by spraying a 4.57 mm (0.18 inch) wide stripe of the solution onto the surface of the flattened casing at a delivery rate of 12.4 ml/min while moving the casing pass the spray nozzle at a speed of 15.24 meters/min (50 feet/min). After contacting the casing, the enzyme solution spread wider than the initial sprayed-on width so that the final width of the stripe could not be determined. However, the calculated loading levels on the MULTIFECT® enzyme for the application levels were as follows:

Sample A 100% solution: 11.5 ml/645 $cm^2$ (100 sq. inches)

Sample B 50% solution: 5.8 ml/645 $cm^2$ (100 sq. inches)

Sample C 25% solution: 2.9 ml/645 $cm^2$ (100 sq. inches)

The casings were held for up to five days at about 40° F. (4° C.). Each sample of casing then was shirred and stuffed with a commercial meat emulsion for making frankfurters to produce strings of linked frankfurters.

The strings were looped over a transport bar as shown in FIG. 2 for transport through a smokehouse for cooking. The smokehouse cooking conditions were set to allow for good peeling. At the end of the cooking cycle and upon removal from the smokehouse, it was found that all links having the stripe of Sample A had split during cooking so the cooked meat had burst through the casing. About 66% of the links of Sample B and about 48% of Sample C also had split. Some of the other links of Samples B and C were oddly shaped due to a weakening of the casing by the enzyme. Non of the frankfurters were of a commercial quality. It was apparent from this test that the concentration of enzyme applied to the casing was excessive.

Nevertheless, the test demonstrated that a stripe of the enzyme solution applied to the casing could act during the stuffing and processing time to open the casing by the end of the processing cycle. Even if the casing was not completely removed by the enzyme, it still would facilitate a non steam peeling operation. This was demonstrated by shaking the strings of linked sausages. After five seconds of shaking, 76% of the sausages made with the Sample A casing, 30% of the sausages made with the Sample B casing and 20% or the sausages made with the Sample C casing had dropped out of the casing.

EXAMPLE VIII

In another test a stripe of the enzyme solution was applied to a non derivatized cellulose casing using two reduced concentrations of the MULTIFECT® XL enzyme solution. One sample was made with a stripe using a 5% concentration of the enzyme and a second sample was made with a stripe at a 10% concentration. The casings were stuffed and cooked under conditions similar to the conditions of Example VII. At the end of the cooking cycle it was found that the casings were still intact indicating that the concentrations used were too diluted to cause the casings to open by the end of the cooking cycle. This together with the previous test is indication that an enzyme concentration of between 10 and 25% would be sufficient to open the casing by the end of the cooking cycle.

EXAMPLE IX

The two samples of stuffed casings from Example VIII at the end of the cooking cycle were showered with a 20% solution of the MULTIFECT® XL enzyme. The solution was prepared by mixing 6 kg of the XL enzyme with 22.2 kg of warm (51.6° C.) water and 1.8 kg of buffer acetate solution to provide the enzyme solution with a pH of 5. The stuffed casings, suspended from a transport bar 32 as shown in FIG. 2, were showered with the warm enzyme solution using a recirculating apparatus as generally shown in FIG. 2. The temperature of the recirculating enzyme solution was maintained at about 51.7° C. (125° F.). After about 20 minutes of the recirculating shower, it was found that some links had fallen from the bar indicating that the casing was weakened to the point where it broke under the weight of the frankfurters. Other links of the cellulose were found to be empty as the casing had opened and the frankfurters had fallen out.

More than half of the frankfurters had fallen from the transport bar after about 35 minutes and only a little manual force was needed to break any of the cellulose casing still intact and the casing was easily removed by rubbing.

After 80 minutes, most of the casing was metabolized and there were only little fragments of the casing left on the frankfurters that were easily removed by running under tap water. Little difference was observed between the two samples indicating that either of the two stripe concentrations together with the enzyme shower was effective to remove the casing from the frankfurters.

Accordingly, it should be appreciated that the method of the present invention accomplishes its intended objects in providing an improved method for removing the cellulose casing from sausages such as frankfurters and the like. The use of an enzyme such as a cellulase or cellulase enzyme complex having xylanase activity can eliminate the need to apply special internal easy peeling coatings to the internal surface of the casing. It further eliminates the need for mechanical peelers and reduces utility costs by eliminating the use of steam in the peeling operation. The use of an enzyme or enzyme complex according to the present invention further eliminates the need to color the casing or provide the casing with stripes to highlight casing that may remain on the sausage after a mechanical peeling operation. The digestion of the casing also eliminates the need to landfill spent casing. Since solution remaining after the casing is metabolized is high in glucose, it can be used as a glucose source wherein the glucose either is recovered or the solution itself is used for its glucose content.

Having described the invention in detail, what is claimed as new is:

1. A method for producing skinless sausages by stuffing a meat emulsion into a cellulose food casing, processing the stuffed casing to produce a string of sausage links and then removing the cellulose casing to provide individual skinless sausages, including facilitating the removing of the casing by applying to the casing prior to said stuffing, a food grade enzyme having the ability to hydrolyze the cellulose casing sufficient to degrade the casing to such an extent that the sausages separate from the casing thereby producing casing-free sausages.

2. A method as in claim 1 wherein applying the food grade enzyme to the cellulose casing comprises applying an aqueous solution comprising the enzyme as a longitudinal stripe on the exterior surface of the casing.

3. A method as in claim 2 further comprising showering the cellulose casing with a solution containing the enzyme after stuffing and processing.

4. A method as in claim 2 further comprising showering the cellulose casing with a solution containing the enzyme after stuffing and while processing to produce the sausage.

5. A method as in claim 3 or 4 comprising maintaining the temperature of the solution during said showering at a temperature of about 52° C.

6. A method as in any one of claims 1–4 wherein said enzyme is derived from *Trichodema reesei*.

7. A method as in any one of claims 1–4 wherein said enzyme has an activity of at least 445 XAU/ml wherein XAU is based on the release of Remazol Brilliant blue-dyed oats spelt xylan at pH 4.5, and a temperature of 40° C. in ten minutes.

8. A method as in claim 1 comprising applying said enzyme to the internal surface of the cellulose casing prior to stuffing.

9. A method at in claim 8 wherein applying said enzyme to the internal surface of the cellulose casing is accomplished by spraying an aqueous solution comprising the enzyme uniformly over the entire internal surface of the casing.

10. A method as in claim 8 comprising maintaining the casing at a temperature below about 4° C. for the period of time prior to stuffing.

11. A method as in claim 8 further comprising:

a) packaging the sausages in a sealable bag after stuffing wherein the sausages remain encased in the cellulose casing;

b) evacuating and sealing the bag; and c) maintaining the sausages in the sealed bag at a temperature of 4° C. for a minimum of fifteen days during which time the casing on the sausages is fully metabolized by the enzyme.

12. A method producing a skinless sausage comprising:

a) stuffing a meat emulsion into a cellulose food casing treated with a ford grade enzyme having the ability to hydrolyze cellulose; and b) processing the stuffed casing to cook the meat emulsion and prepare a sausage, c) said processing being conducted under conditions that permit the enzyme to metabolize an amount of the cellulose casing sufficient to degrade the casing to such an extent that the sausage separates from the casing thereby producing a casing-free sausage.

13. A method for producing skinless sausages comprising:

a) stuffing a meat emulsion into a cellulose food casing treated with a food grade enzyme having the ability to hydrolyze the cellulose to produce a string of connected sausage links;

b) processing the string to cook the meat emulsion and prepare sausages; and c) showering the string with a solution comprising a food approved enzyme capable of hydrolyzing the cellulose under conditions permitting the enzyme to metabolize the cellulose casing sufficient to degrade the casing to such an extent that cooked sausages separate from the casing thereby producing casing free sausages.

14. A method as in claim 13 wherein said showering occurs after the processing step to cook the emulsion.

15. A method as in claim 13 wherein the food approved enzyme has an activity of at least 445 XAU/ml wherein XAU is based on the release of Remazol Brilliant blue-dyed oats spelt xylan at pH 4.5, and a temperature of 40° C. in ten minutes and is buffered to a pH of 5.

16. A method as in claim 13 wherein the solution is kept at a temperature of 52° C. during said showering.

17. A method as in claim 16 comprises applying a solution of the enzyme in the form of a stripe extending along the outer surface of the casing prior to stuffing.

* * * * *

UNITED STATES PATENT AND TRADEMARK OFFICE
CERTIFICATE OF CORRECTION

PATENT NO    : 6,132,779
DATED        : October 17, 2000
INVENTOR(S)  : Jean-Francois Lacoste-Bourgeacq, Majed Fawaz It is certified that error appears in the above-identified patent and that said Letters Patent is hereby corrected as shown below:

Column 8, Line 17, change "place" to read "placed"

Column 9, Line 31, change "cellulase" to read "cellulose"

Column 13, Line 12, change "ford" to read "food"

Signed and Sealed this

Eighth Day of May, 2001

Attest:

NICHOLAS P. GODICI

Attesting Officer

Acting Director of the United States Patent and Trademark Office